D. R. HAYES.
ADJUSTABLE SCALE HOLDER.
APPLICATION FILED DEC. 23, 1918.
1,324,963.
Patented Dec. 16, 1919.
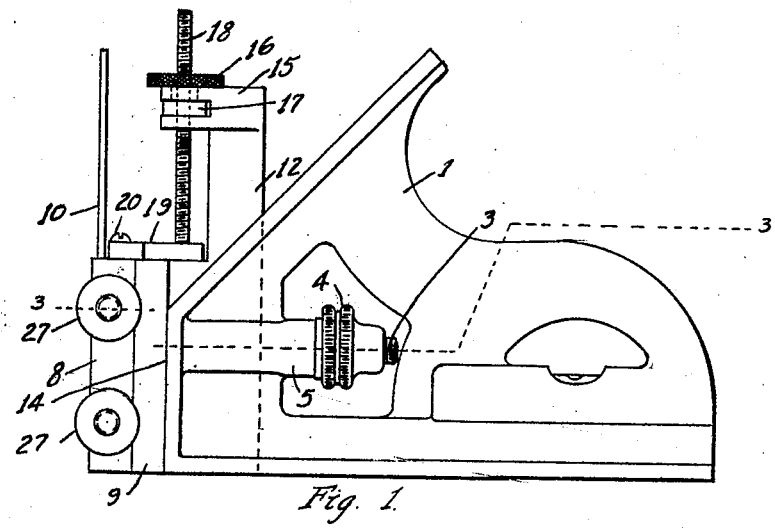
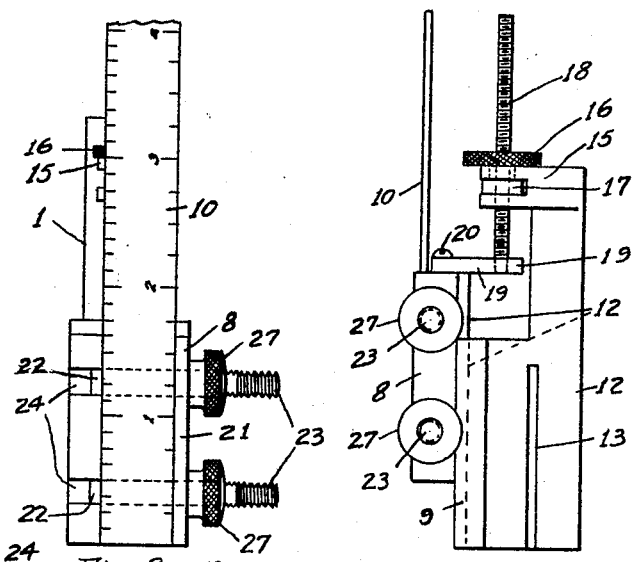
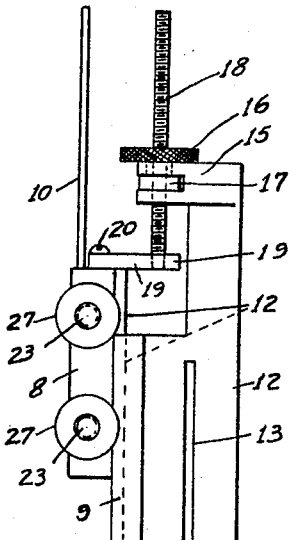
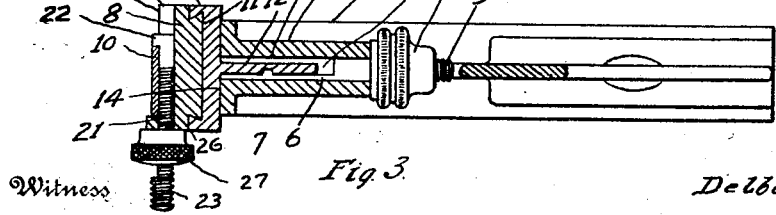
Witness
L. S. Woodhull
Inventor
Delbert R. Hayes
By B. F. Wheeler
Attorney

UNITED STATES PATENT OFFICE.

DELBERT R. HAYES, OF DETROIT, MICHIGAN.

ADJUSTABLE SCALE-HOLDER.

1,324,963.  Specification of Letters Patent.  Patented Dec. 16, 1919.

Application filed December 23, 1918. Serial No. 267,932.

*To all whom it may concern:*

Be it known that I, DELBERT R. HAYES, a citizen of the United States, residing at Detroit, in the county of Wayne and State of Michigan, have invented a new and useful Adjustable Scale-Holder, of which the following is a specification.

This invention relates to adjustable scale holders and relates particularly to scale holders for use in association with a certain machinist's tool commonly known as a combination square.

It is the object of the invention to provide a scale holder equipped with means for effecting a gradual and highly accurate longitudinal adjustment of a scale and for positively holding the scale in any desired position of adjustment without manipulation of any clamping device.

A further object of the invention is to improve a combination square by providing for replacement of the scale thereof with a holder of the aforesaid character, the clamping means originally intended for positioning the scale upon the head of the square being adapted to perform the same function for the adjustable scale holder.

In attaining these objects the invention contemplates a scale holder construction primarily comprising two parts adapted for relative sliding adjustment, one of said parts being equipped with means for clamping a scale thereupon, and the other having a flange proportioned to correspond to the scale originally intended for use with a combination square, and being engageable by the clamping means on the head of the square, an adjusting screw being employed to relatively shift said two parts.

A preferred embodiment of the invention is illustrated in the accompanying drawing, wherein, Figure 1 is a view in side elevation of the herein-described adjustable scale holder showing the same associated with the head of a mechanic's tool commonly known as a combination square.

Fig. 2 is a front view of the same.

Fig. 3 is a horizontal sectional view taken on the line 3—3 of Fig. 1.

Fig. 4 is a view of the scale holder removed from the combination square, the scale being adjusted to a position differing from that shown in the other figures.

In these views the reference character 1 designates the head of a combination square, and 2 the groove thereof originally intended to receive a steel scale. 3 is the screw and 4 the clamping nut originally intended to directly engage the scale to hold the same fixed in various positions of longitudinal adjustment within the groove 2, said screw being mounted transversely to said groove in a sleeve 5 integral with the head 1. Said screw has a reduced end portion 6 contiguous with a lateral surface of the scale and terminating in a lug 7, which it has hitherto been the practice to engage with a longitudinal groove in the scale so as to permit the latter to be drawn firmly against the bottom of the groove 2 upon tightening the nut 4.

In changing the setting of scale relative to the head 1, the original construction heretofore mentioned has required first that the clamping nut 4 be loosened, then that the scale be grasped and manually shifted to the desired position, and finally that said nut be again tightened. Difficulty is frequently met with in thus establishing exactly a desired position of the scale and maintaining said position during tightening of the clamping screw. The invention eliminates this difficulty by providing a holder and adapting the scale to be shifted longitudinally in said holder by means of a suitable adjusting screw. Said holder comprises two parts 8 and 9 the former carrying the scale 10 and having a dovetailed sliding engagement with the latter as indicated at 11. The member 9 is formed with a lateral flange or tongue 12 which is engageable in the groove 2, said flange thus corresponding substantially to the scale ordinarily employed with the head 1. Formed longitudinally in the flange 12 is a groove 13 engageable by the lug 7 of the screw 3 so that said screw and the nut 4 may serve to clamp the member 9 in fixed relation to the head 1. Instead of the flange 12 being drawn against the bottom of the groove 2, the member 9 is clamped against the vertical edge face 14 of the head, which face provides a firm seat.

The flange 12 is extended upwardly some distance above the member 9 and is provided at its upper end with a bifurcated bearing 15 in which is swiveled a knurled nut 16, said nut having a collar 17 engaged between the bifurcations of said bearing and restraining the nut from axial movement. With said nut is engaged a vertical adjusting screw 18, the lower end of which is fixedly secured to a plate 19 attached by screws 20 to the top of the movable member 8. Thus, through turning the nut 16, the member 8 and the scale 10 carried by said member will be subjected to a vertical adjustment, being guided in said adjustment and snugly held against any lateral movement by its dove-tailed engagement with the member 9.

As a preferred means for detachably securing the scale 10 to the mounting 8, the latter is provided with a shoulder 21 at one edge of the face 22 thereof, against which the scale is adapted to seat, said shoulder forming a vertically alining abutment for one longitudinal edge of the scale. The other edge of said scale is engageable by lugs 22 terminally formed upon a pair of clamping screws 23, said screws being loosely engaged within transverse grooves 24 in the face 25 of the member 8, and being extended loosely through orifices 26 in the shoulder 21. Clamping nuts 27 upon said screws are adapted to bear against the edge face of the member 8 for adjusting the screws to bind the scale against the shoulder 21.

It is to be noted that for ordinary adjustments of the scale, the means heretofore employed is still available. That is to say, the nut 4 may be turned to relieve the clamping stress, and the holder and scale may be bodily shifted relative to the head 1 to approximately position the scale, said nut then being again screwed tight. But for fine adjustments requiring a high degree of precision in positioning the scale its movement may be positively accurately effected through proper manipulation of the adjusting nut 16.

What I claim is:

1. In a device of the character described, the combination with a scale, a mounting for said scale providing an abutment for one edge of the scale, a clamping member engaging the other edge of said scale, a support slidably engaged by said mounting, the direction of movement being substantially parallel to the scale, and means for gradually slidably adjusting the mounting in said support.

2. In a device of the character described, the combination with a scale, of a holder therefor, means for gradually adjusting said scale longitudinally upon said holder, a combination square, and means for clamping said holder to said square.

3. In a device of the character described, the combination with a scale, of a holder therefor having a projecting flange, means for gradually adjusting said scale upon said holder, a combination square having a groove in the head thereof for receiving said flange, and means carried by said head engageable with said flange for clamping the holder against said head.

4. In a device of the character described, the combination with a scale, of a mounting for said scale, clamping means detachably engaging the scale with said mounting, a holder slidably engaged by the mounting, the direction of movement being substantially parallel to the scale, said holder having a projecting flange, means for gradually slidably adjusting the mounting in said support, a combination square having a groove in the head thereof for receiving said flange, and means carried by said head engageable with said flange for clamping the holder against said head.

In testimony whereof I sign this specification.

DELBERT R. HAYES.